May 27, 1958 K. F. SCHLICHTING 2,835,918

FISH HEAD AND TAIL CUTTER

Filed Nov. 22, 1955 3 Sheets-Sheet 1

Inventor
K. F. Schlichting
By Richards & Geier
Attorneys

May 27, 1958  K. F. SCHLICHTING  2,835,918
FISH HEAD AND TAIL CUTTER
Filed Nov. 22, 1955  3 Sheets-Sheet 2
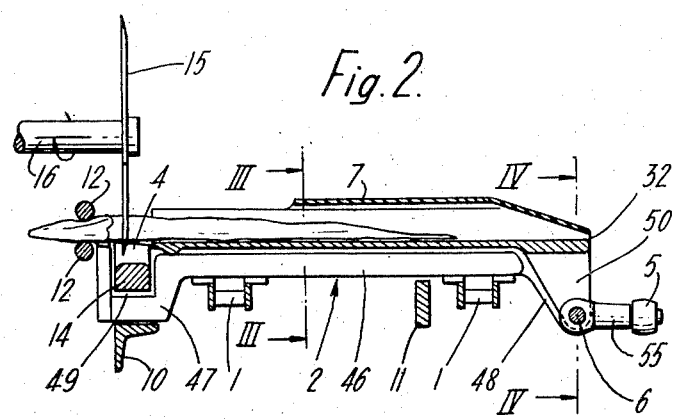
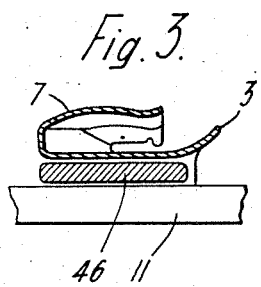
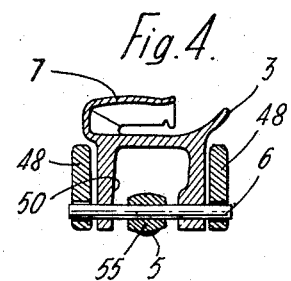
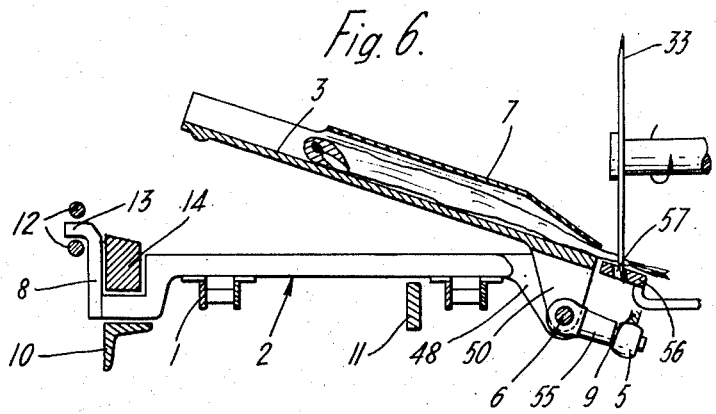
Inventor
K. F. Schlichting
By Richards & Geier
Attorneys

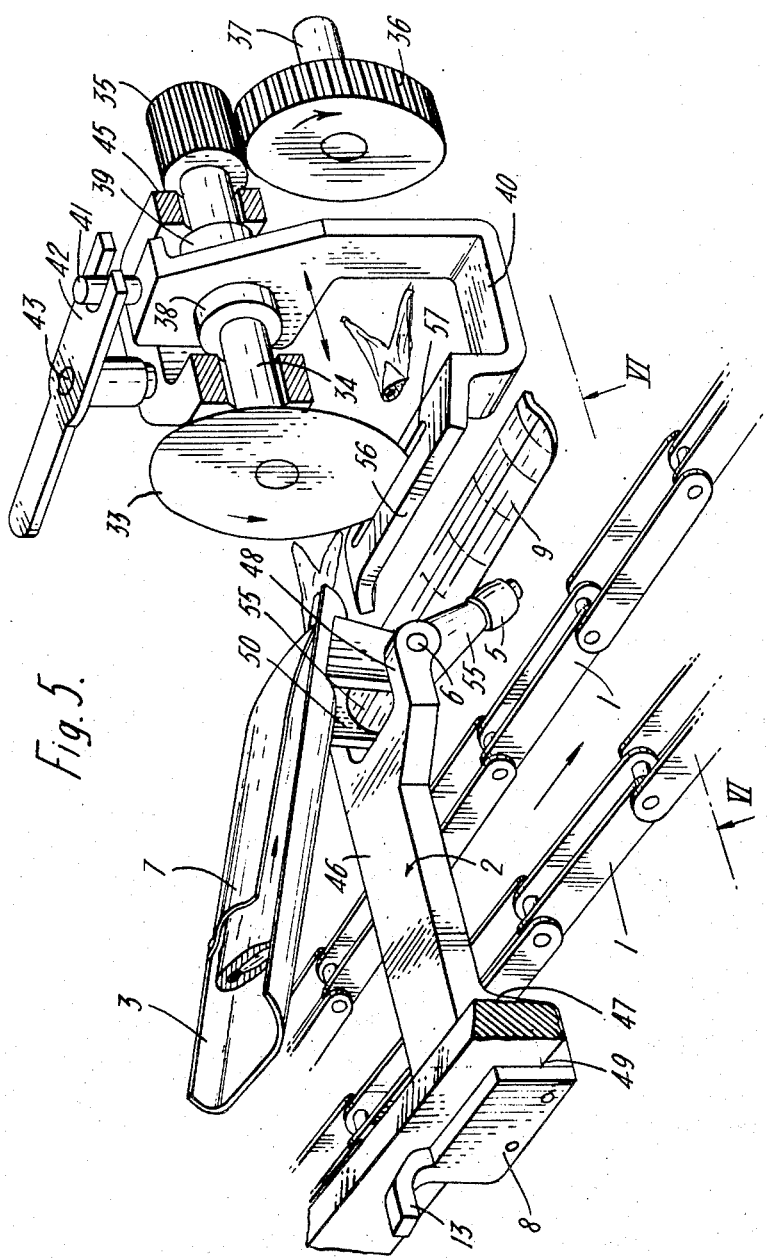

United States Patent Office 2,835,918
Patented May 27, 1958

2,835,918

FISH HEAD AND TAIL CUTTER

Karl Friedrich Schlichting, Lubeck, Germany, assignor to Nordischer Maschinenbau Rud. Baader, Lubeck, Germany Application November 22, 1955, Serial No. 548,447

3 Claims. (Cl. 17—4)

This invention relates to the dressing of fish.

According to the invention a fish is put in a moving holder having walls lying beneath and behind the fish and is pushed through the holder to introduce the snout into a guide which lies outside of and parallel to the path of movement of the holder and which receives the snout up to the eyes and supports the snout from below. A cut is then made through the fish between the holder and the guide while support is given to the fish behind the snout. At this stage, therefore, the fish is bridging a space in which it is engaged by a cutting knife, and such support is given to it on each side of this space that it does not move bodily when engaged by the knife but rather is cut as required. To ensure that despite variations in size of fish the cut is made close to the line which leaves the maximum amount of flesh on the body the position of the cut is varied in accordance with the thickness of the fish.

Preferably the support behind the snout is rigid with the holder and connected to it by a part extending across but outside of the cutting path of the knife.

It is most convenient to use a rotary cutting knife, and to vary the position of the cut there may be means operated in accordance with the size of each fish and comprising a feeler bearing on the fish and rocked about a horizontal axis by it, and the movement of the feeler may be transmitted by a sliding connection to an arm which carries the knife shaft and is mounted to move towards and away from the path of travel of the fish.

In the preferred machine the tails as well as the heads of the fish are cut off. To enable this to be done the fish holders are mounted to tilt about horizontal axes to cause the fish to slide longitudinally in them and so to bring the tails of the fish into the path of a second cutting knife.

One machine according to the invention will now be described by way of example with reference to the accompanying drawings, in which:

Figure 2 is a cross-section taken substantially on the line II—II in Figure 1;

Figures 3 and 4 are sections on the lines III—III and IV—IV respectively in Figure 2;

Figure 5 is a perspective view of another part of the machine looking from the opposite direction to that in Figure 1;

Figure 6 is a cross-section taken substantially on the line VI—VI in Figure 5.

Figure 1:
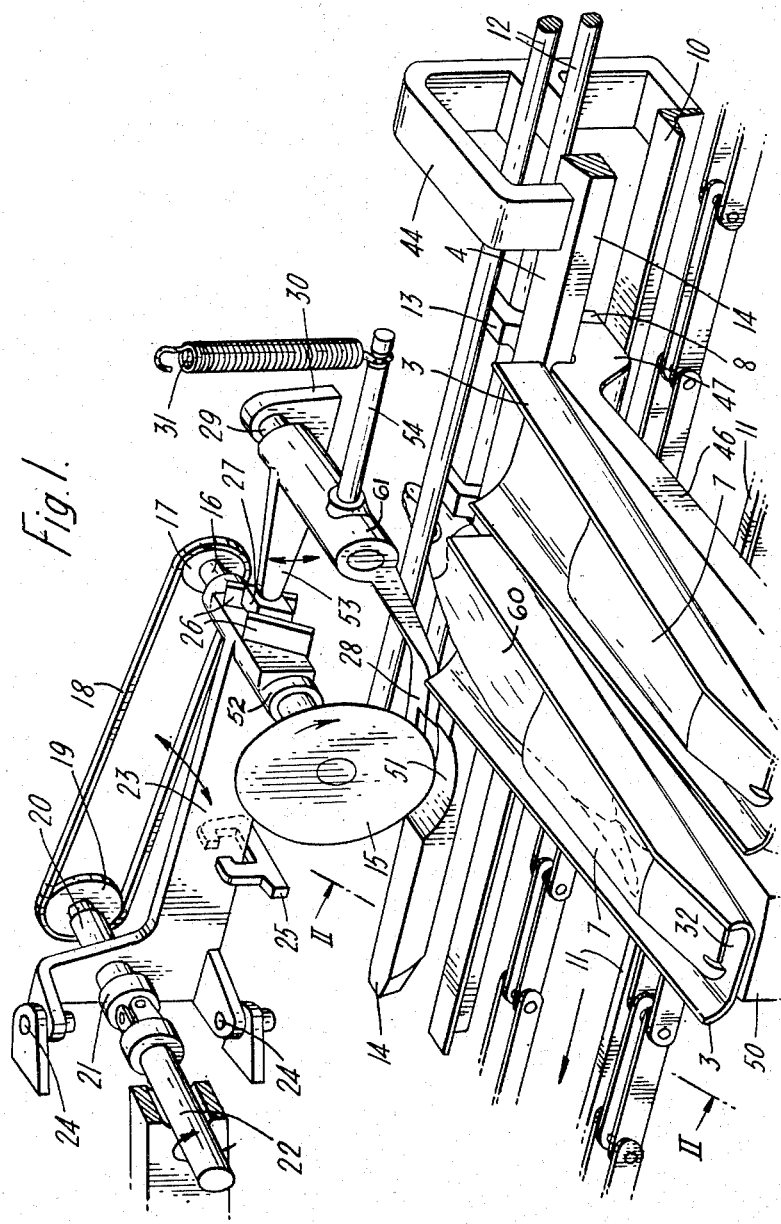
Figure 1 is a perspective view of part of the machine.

The machine comprises a conveyor 1 composed of two endless chains running in a frame not shown and carrying a number of attachments 2, each composed of a bar 46 cranked at one end as shown at 47 and forked at the other end as shown at 48. A strip 8 is fixed to the cranked end 47 to form with that end a channel 49. As the conveyor 1 runs, the attachments 2 run over and are supported by an angle iron 10 and a bar 11 and are guided by a fixed bar 14 in the channel 49.

A fish holder 3 normally rests on each attachment 2 and is so inclined to the centre line of the attachment that the end which receives the tail of the fish 60 leads the head end as the holder travels. Each fish holder 3 has downward projections 50 which extend from the tail end of the holder between the arms of the forked end 48 of the attachment 2 and are pivotally mounted on that end about a pin 6. Each holder 3 also has a cover 7 extending over part of its length to ensure that the fish will not fall out, though the fish is free to slide longitudinally in the holder. At the tail end, the cover is bent downwardly to leave only a slot 32 between it and the bottom of the holder, this slot allowing the tail fins but not the body of the fish to pass through it.

In operation a fish 60 is put manually in a holder 3 with its belly leading and is pushed longitudinally so that its snout enters the vertical space between two parallel guide rails 12. This space is deep enough to allow the snout but not the bony structure close to the eyes to enter. Thus the rails 12 act as stops on each side of the fish head close to the eyes. Of course the space between the rails 12 must be made suitable for the average size of the fish in the catch under treatment. Each attachment 2 has an offset lug 13 which travels between the rails 12 and acts as a support for the back of the snout of the fish.

In the longitudinal displacement of the fish to introduce the snout between the guide rails 12, the undersurface of the head end of the fish slides over the bar 14. This bar acts as a support for that part of the fish which is close to the eyes and extends towards the tail side, and its upper surface is inclined as shown at 4 so as to be substantially complementary to the surface of the fish.

The fish lying in its holder 3 is carried past a rotary disc knife 15 which rotates about an axis substantially at right angles to the direction of movement of the conveyor 1 and cuts off the head. To prevent this knife fouling the guide bar 14, a curved recess 51 is made in the bar. Since the holder 3 is inclined and not at right angles to the direction of movement of the conveyor 1, the cut made by the knife 15 is inclined to the backbone of the fish, and in fact can be made wholly or nearly coincident with the edges of the gill covers, thus reducing the loss of flesh on the head to a minimum.

During the cutting the body of the fish is supported from below and at the back by the holder 3. The snout is supported from below by the lower guide rail 12, and the back of the snout is supported by the lug 13; the fish is therefore firmly presented to the knife.

The fish in any given catch vary in size, and of course the cut made by the knife 15 should be at a distance from the rails 12 that depends on the size of the fish; otherwise although it may be parallel to the edges of the gill covers it will not be coincident with them. Therefore provision is made for moving the knife towards or away from the rails 12 in accordance with the size of the fish. For this purpose the shaft 16 of the knife 15 is mounted in a bearing sleeve 52 carried on one end of an arm 23, the other end of which is carried in vertical pivots 24. Two abutments 26 project from the sleeve 52 and a block 27 lies between them. The abutments 26 are parallel to one another and inclined to the vertical. Therefore by causing the block 27 to slide up and down vertically between the abutments 26 a lateral thrust is exerted in one or other direction, so that the arm 23 is rocked and thus the position of the knife 15 is changed. The block 27 is fixed to the end of an arm 53 of a bell crank 61 which can rock about a fixed horizontal bolt 29, the other arm of the bell crank being a feeler 28 projecting downwards to come into contact with the head of each fish in turn. The fish head forces the feeler 28 upwards against the action of a tension spring 31 connected to an arm 54 projecting from the bell crank 61. The extent of the rocking motion of the bell crank 61 depends on the thickness of the head and so is substantially proportional to the distance between the eyes and the edges of the gill covers of the fish. Therefore the knife 15 is brought to the right position for making the heading cut.

The feeler 28 must, of course, cause the knife 15 to move to its proper position at the right moment, and therefore lies alongside the knife as shown in Figure 1.

The rocking movement of the arm 23 is limited by an adjustable stop 25.

The knife 15 is driven from a shaft 22 through a universal coupling 21, a shaft 20, a pulley 19, a V-belt 18 and a pulley 17 fixed to the shaft 16.

When the head has been removed, the fish 60 is moved longitudinally in its holder 3 to cause the tail fin to pass through the slot 32, and the holder then carries the fish to a rotary disc knife 33 which cuts off the tail fin. The longitudinal movement of the fish is produced by tilting the holder 3 about the pin 6, the tilting being effected by the engagement of a roller 5 on an extension 55 of the projections 50 with a fixed cam 9. The angle through which the holder 3 is tilted is such that the fish slides down it under gravity. During the cutting the tail fins ride over a support 56 having a slot 57 in which the knife 33 runs.

In order to adjust the position at which the knife 33 cuts in accordance with changes in the average size of the fish under treatment, the knife 33 is made movable towards and away from the fish holder 3. The knife is carried on a shaft 34 passing through a frame member 40 with which the support 56 is integral, the shaft 34 having two collars 38 and 39 which lie one on each side of the member 40 and also carrying a gear wheel 35. This wheel is longer axially than a gear wheel 36 by which it is driven and which is fixed to a driving shaft 37. The shaft 34 is carried on a fixed frame member 45 which also carries a pin 43 on which a lever 42 can rock. One end of the lever 42 is forked to fit round a pin 41 on the member 40, so by rocking the other end of the lever 42 the whole assembly of knife 33 and frame member 40 can be adjusted in position.

The invention is particularly useful in the dressing of herrings and similar fish.

I claim:

1. In a fish-dressing machine in combination with an endless conveyor and a cutter located adjacent thereto; a bar carried upon said conveyor and extending transversely to the direction thereof, said bar having a forked end, a fish holder located above said bar and having end projections extending into said forked end, a pin extending through said forked end and said projections, whereby said fish holder is swingable about said pin, and a cover located above said fish holder and connected to one side thereof, said cover being spaced from said fish holder to permit a fish to slide upon said fish holder, said cover having an end extending toward said fish holder and spaced therefrom to provide a slot sufficient for the passage of the tail fins of the fish, but not for the body thereof.

2. In a fish-dressing machine in combination with an endless conveyor and a cutter located adjacent thereto; a bar carried upon said conveyor and extending transversely to the direction thereof, said bar having a cranked end and an opposite forked end, a strip connected with said cranked end to form a channel, a fixed bar in said channel, a fish holder located above said bar and having end projections extending into said forked end, a pin extending through said forked end and said projections, whereby said fish holder is swingable about said pin, a cover located above said fish holder and connected to one side thereof, said cover being spaced from said fish holder to permit a fish to slide upon said fish holder, said cover having an end extending toward said fish holder and spaced therefrom to provide a slot sufficient for the passage of the tail fins of the fish, but not for the body thereof, and guide rails extending parallel to said channel for receiving the snout of the fish.

3. In a fish-dressing machine in combination with an endless conveyor and a cutter located adjacent thereto; a bar carried upon said conveyor and extending transversely to the direction thereof, said bar having a forked end, a fish holder located above said bar and having end projections extending into said forked end, a pin extending through said forked end and said projections, whereby said fish holder is swingable about said pin, a cover located above said fish holder and connected to one side thereof, said cover being spaced from said fish holder to permit a fish to slide upon said fish holder, said cover having an end extending toward said fish holder and spaced therefrom to provide a slot sufficient for the passage of the tail fins of the fish, but not for the body thereof, an extension member carried by one of said end projections, a roller carried by said extension member, and a fixed cam adapted to engage said roller to swing said fish holder.

References Cited in the file of this patent

UNITED STATES PATENTS

| | | |
|---|---|---|
| 1,320,990 | Butler | Nov. 4, 1919 |
| 2,245,330 | Danielsson | June 10, 1941 |
| 2,431,465 | Christiansen | Nov. 24, 1947 |
| 2,546,346 | Oates | Mar. 27, 1951 |
| 2,704,378 | Schlichting | Mar. 22, 1955 |